United States Patent
Schloss

(10) Patent No.: US 9,309,764 B1
(45) Date of Patent: Apr. 12, 2016

(54) METHOD FOR LIMITING ARTICULATION OF A CHAIN JOINT USING A CHAIN LINK EXTENSION OF A CHAIN ASSEMBLY

(71) Applicant: Charles M. Schloss, Aurora, CO (US)

(72) Inventor: Charles M. Schloss, Aurora, CO (US)

(*) Notice: Subject to any disclaimer, the term of this patent is extended or adjusted under 35 U.S.C. 154(b) by 0 days.

(21) Appl. No.: 14/810,633

(22) Filed: Jul. 28, 2015

(51) Int. Cl.
| F16G 15/02 | (2006.01) |
| E21F 13/06 | (2006.01) |
| F16G 13/20 | (2006.01) |
| F16G 13/06 | (2006.01) |

(52) U.S. Cl.
CPC ............ *E21F 13/066* (2013.01); *F16G 13/06* (2013.01); *F16G 13/20* (2013.01); *F16G 15/02* (2013.01)

(58) Field of Classification Search
CPC ....... F16G 13/06; F16G 13/20; F16G 13/066; E21F 13/066
USPC ............................................................ 59/78
See application file for complete search history.

(56) References Cited

U.S. PATENT DOCUMENTS

| 3,217,553 | A | * | 11/1965 | Patrignani | ............... | F16G 13/06 |
| | | | | | | 474/140 |
| 4,941,316 | A | * | 7/1990 | Bechtold | ............... | B21L 9/065 |
| | | | | | | 292/264 |
| 5,139,464 | A | * | 8/1992 | Lehnert | ............... | E04H 12/185 |
| | | | | | | 474/155 |
| 6,662,545 | B1 | * | 12/2003 | Yoshida | ............... | B65G 17/065 |
| | | | | | | 198/851 |
| 6,952,916 | B1 | * | 10/2005 | Fountaine | ............... | E05F 11/06 |
| | | | | | | 59/5 |
| 7,546,726 | B1 | * | 6/2009 | Wu | ............... | F16G 13/06 |
| | | | | | | 198/851 |
| 8,336,286 | B2 | * | 12/2012 | Veltrop | ............... | B05C 17/0116 |
| | | | | | | 222/113 |
| 8,695,320 | B2 | * | 4/2014 | Scolari | ............... | F16G 13/20 |
| | | | | | | 198/784 |
| 2004/0157691 | A1 | * | 8/2004 | Olmsted | ............... | E05F 15/67 |
| | | | | | | 474/152 |
| 2014/0109701 | A1 | * | 4/2014 | Ishikawa | ............... | F16G 13/20 |
| | | | | | | 74/30 |

* cited by examiner

*Primary Examiner* — David B Jones
(74) *Attorney, Agent, or Firm* — Edwin H. Crabtree; Ramon L. Pizarro

(57) ABSTRACT

A method of limiting articulation of a chain joint in a chain assembly using plurality of chain plates. The chain plates prevent articulation of the chain assembly in one direction. The chain plates, as an example, include a neck portion and a body portion. The neck portion has a width less than a width between a pair of first side bars. The first side bars have end portions mounted on a chain barrel. The neck portion is attached to the first side bars. Also, a pair of second side bars are mounted on the chain barrel. The body portion of the chain plate has a width greater than a width between the second side bars. The body portion rest on top of a portion of the second side bars and prevents joint articulation of the second side bars in one direction during the movement of the chain assembly.

15 Claims, 3 Drawing Sheets

METHOD FOR LIMITING ARTICULATION OF A CHAIN JOINT USING A CHAIN LINK EXTENSION OF A CHAIN ASSEMBLY

This non-provisional patent application claims the benefit and the subject matter of a provisional patent application, Ser. No. 62/068,798, filed on Oct. 27, 2014, by the subject inventor/applicant. The provisional application has a title of "Chain Assembly with Limited Articulation".

BACKGROUND OF THE INVENTION (a) Field of the Invention

This invention relates to a method for preventing articulation of chain joints in one direction in a suspended, endless, chain assembly. The method for limiting chain joint movement is provided by an addition of a chain link extension, such as a chain plate and the like attached to one end of a pair of parallel sidebars. The sidebars, with barrel and connecting pin, are used in making up the endless chain assembly. The method of limiting the joint articulation in a chain assembly is a critical element in a design of certain machinery used in the fields of waste water treatment, water treatment, and other mechanisms. This is particularly true with a chain assembly driven by a drive sprocket and without the use of an idle sprocket.

(b) Discussion of Prior Art

A method of limiting chain joint articulation in one direction, particularly inwardly on a suspended chain assembly, can provide a means of simplifying a design of certain machines and thereby increase reliability, economy, and reduce maintenance.

In the U.S., where most of modern chain design has occurred, U.S. Pat. Nos. 2,226,989 and 2,235,854 teach the design of a chain and chain attachments that freely articulate in one direction (away from the attachment side), but restrict the amount of articulation toward the attachment side. This type of articulation limiting is achieved by abutting surfaces within a chain joint. In U.S. Pat. No. 5,425,875, a chain design incorporates this concept with limited articulation in one direction, which is linear, by simply rotating the abutting surfaces in the chain joint.

Other methods of limiting articulation include extending a portion of the chain link side-bar into the interior of the adjacent chain link where an extension contacts an integral boss in the link. This feature limits articulation to linear and is shown as a Link-Belt cast manganese steel Apron Feeder chain, 1952. Another method is that used by Caterpillar Tractor and others whereby abutting ends of the forged steel crawler links abut each other, with further back bend limited also by abutting grouser (shoe) plates.

None of these prior art articulation limiting designs provide a method for limiting chain joint articulation in one direction using a chain link extension and the like as disclosed herein.

SUMMARY OF THE INVENTION

In view of the foregoing, it is the primary objective of the subject invention to provide a method for limiting chain joint articulation in one direction using a plurality of chain plates and similar devices to easily modify a standard, mass produced, chain assembly. This concept can be used for design of integral cast links or custom chain links.

Another object of this invention is the subject method, using chain link extensions, doesn't trap conveyed or contaminating materials within the endless chain assembly, thereby prolonging chain life and reduced maintenance of the equipment.

Still another object of the method, using chain link extensions, is to keep the chain assembly spaced apart in a normal circular operating position, when the assembly is suspended and without the use of an idle sprocket.

The method for limiting articulation of chain joints includes attaching a plurality of chain link extensions, such as chain plates, to the chain assembly. The chain plates, as an example, can include a neck portion and a body portion. The neck portion has a width less than a width between a pair of parallel first side bars. The first side bars have end portions mounted on a first chain barrel with pin. Opposite sides of the neck portion are attached to the end portions of the first side bars. End portions of a pair of parallel, second side bars are mounted on the first chain barrel with pin. The body portion of the chain plate has a width greater than the width of the neck portion. Also, the width of the body portion is greater than a width between the second side bars. Opposite sides of the body portion rest on top of a portion of the second side bars and prevent joint articulation of the second side bars in one direction during the movement of the chain assembly.

These and other objects of the present invention will become apparent to those familiar with the design and operation of machines which require an incorporation of articulation limited chain assembly components.

BRIEF DESCRIPTION OF THE DRAWINGS

The accompanying drawings illustrate embodiments of the present invention according to the best and most economical modes presently devised for an articulation limited chain assembly, and in which.

DETAILED DESCRIPTION OF THE PREFERRED EMBODIMENTS

Figure 1:
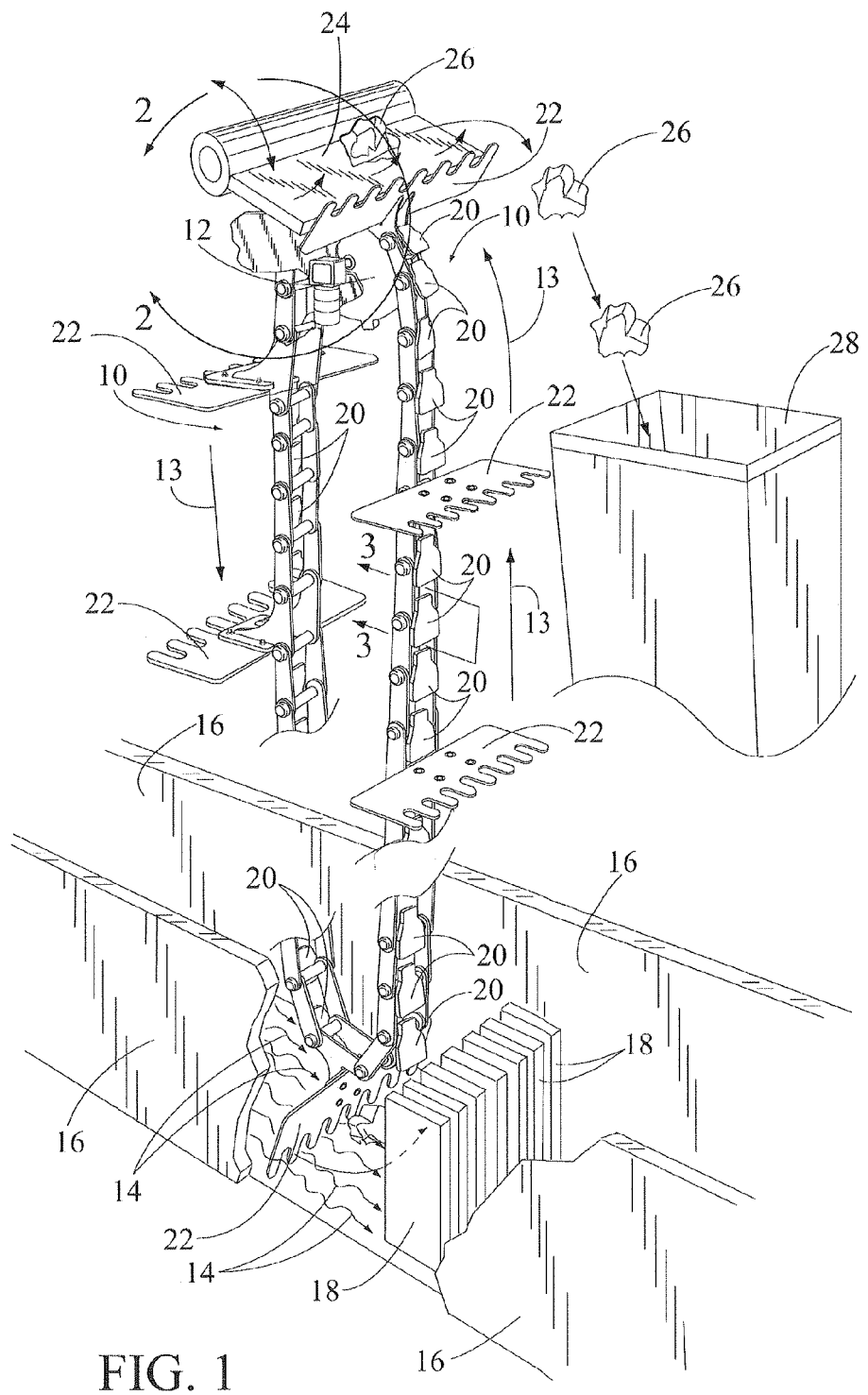
FIG. 1 is a perspective view of the chain assembly driven by a drive sprocket with a lower portion of the chain assembly suspended in a waste water stream in a water channel with vertical divider bars. The chain assembly is shown with a plurality of the chain link extensions, such as chain plates. Also, the chain assembly includes solid waste rakes mounted thereon.

In FIG. 1, a perspective view of an endless, chain assembly is shown and having a general reference numeral 10. The chain assembly 10 is driven by a drive sprocket 12 attached to a drive motor. The drive motor drives the drive sprocket 12 in a counterclockwise direction, as shown by arrows 13. The drive motor is not shown in the drawings.

In this drawing, it should be noted that a lower portion of the chain assembly 10 does not include an idle sprocket, since it is suspended into a waste water stream, indicated by arrows 14. The waste water 14 runs downstream from left to right inside a waste water channel 16. The waste water channel 16 includes a plurality of parallel, vertical, divider bars 18 used for trapping solid waste, such as toilet paper, condoms, disposable tampons, etc. in the water stream. The divider bars are typically ¼ to ¼ inch in thickness, 1 to 3 inches in width, and can be from 12 inches to 10 to 12 feet high depending on a depth of the waste water 14.

The chain assembly 10 is shown with a plurality chain link extensions, such as chain plates, having general reference numeral 20, and a plurality of spaced apart, solid waste rakes 22. A top portion of the assembly 10 is shown with a wiper blade 24 used for removing solid waste 26 from the rakes 22 and dropping the waste into an open top waste chute 28.

While the chain link extensions or chain plates 20 are shown incorporated into the chain assembly 10 and used in a waste water application, it should be kept in mind the chain plates 20 can be used in a variety of chain applications equally well and without departing from the scope and the spirit of the invention as disclosed herein.

Figure 2:
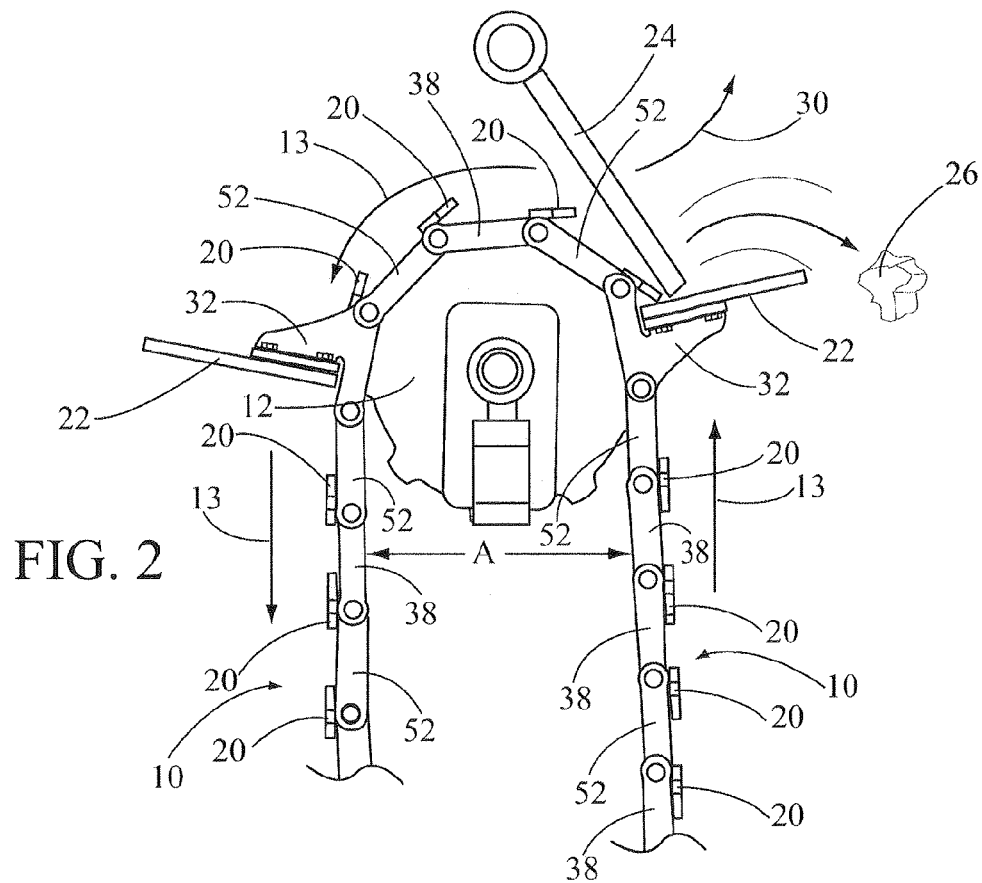
FIG. 2 is front view of a top portion of the chain assembly illustrating a wiper blade used to remove solid wastes from the solid waste rakes.

In FIG. 2, a front view of a top portion of the chain assembly 10 is illustrated. In this view, the chain assembly 10 is shown with the wiper blade 24 rotated in a counterclockwise direction, as indicated by arrow 30, and used to remove the solid wastes 26 from the solid waste rake 22. Each of the solid waste rakes 24 are shown mounted on a rake mounting plate 32. The rake mounting plates 32 are part of the linkage making up the chain assembly 10.

Figure 3:
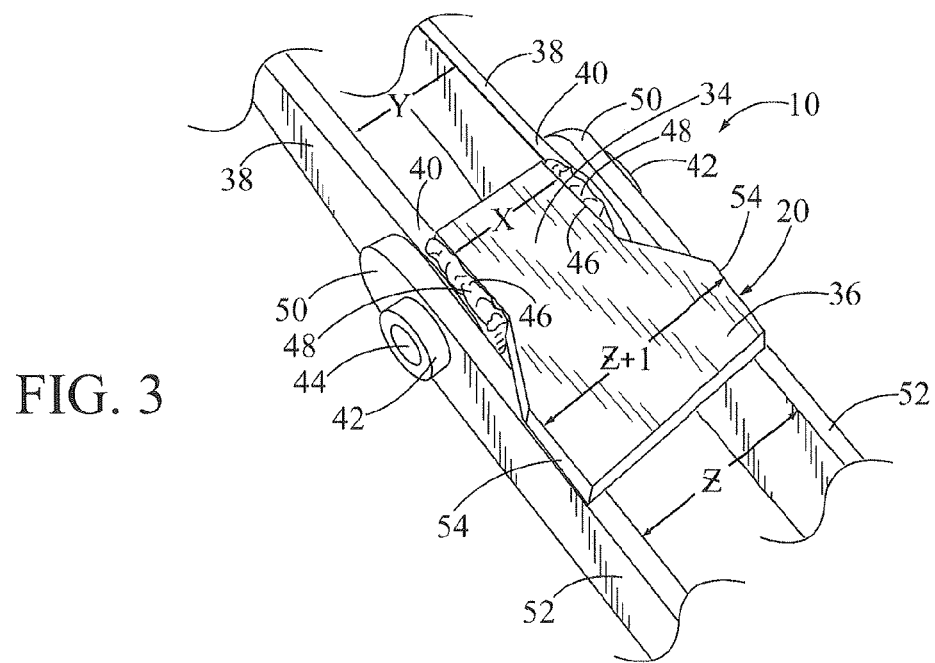
FIG. 3 illustrates one of the chain plates attached to end portions of a pair of parallel, spaced apart side bars.

In FIG. 3, an enlarged perspective view of one embodiment of the chain plate 20 is shown having a having a neck portion 34 and a body portion 36. The neck portion 34 has a width "X", which is less than a width "Y" between a pair of parallel, spaced apart, first side bars 38. The first side bars 38 have end portions 40 mounted on a chain barrel 42 with connecting chain pin 44. Opposite sides 46 of the neck portion 34 are attached, such as welding 48, to the end portions 40 of the first side bars 38 and provide a chain link extension of the side bars. While the chain plate 20 is shown having a neck portion 34 and body portion 36, it can be appreciated by those skilled in the art of chain designs, various sizes and shapes of the chain plate 20 can be used for limiting the articulation of the chain assembly 10 in one direction.

Also shown in this drawing are end portions 50 of a pair of parallel, spaced apart, second side bars 52 mounted on the chain barrel 42. The second side bars 52 are spaced apart a width "Z". The body portion 36 of the chain wedge plate 20 has a width "Z+1", which is greater than the width "Z" and obviously greater than the width "X" of the neck portion 34. Opposite sides 54 of the body portion 36 rest on top of a portion of the second side bars 52 and prevent joint articulation of the second side bars 52 in one direction during the movement of the chain assembly 10.

While not shown in FIG. 3, a lower portion of the second side bars 52 would taper downwardly where the width between the side bars would be the width "Y" for attachment to one of the chain barrels 42. In this manner, both the first and second side bars 38 and 52 would have the same width therebetween prior to attachment to the chain barrel.

From reviewing all of the drawings, it can be seen that the chain assembly 10 is made up of alternating first and second side bars 38 and 52 having end portions attached to the neck portion 34 of the chain plates 20. Also, the side bars are each connected to chain barrels 42. The barrels 42 rotate on the chain pins 44.

Referring back to FIG. 2 and the top portion of the chain assembly 10, it can be seen that the chain plates 20 attached to either the ends of the first side bars 38 or the ends of the second side bars 52 are free to articulate or move outwardly as the chain assembly 10 is rotated on the drive sprocket 12. But, the chain plates 20 prevent the chain assembly 10 from articulating or moving inwardly and reducing a spaced relationship "A" between the suspended portions of the assembly. This key feature of the invention is important with the chain plates 20 helping to prevent the suspended portion of the chain assembly 10 contacting itself.

Figure 4:
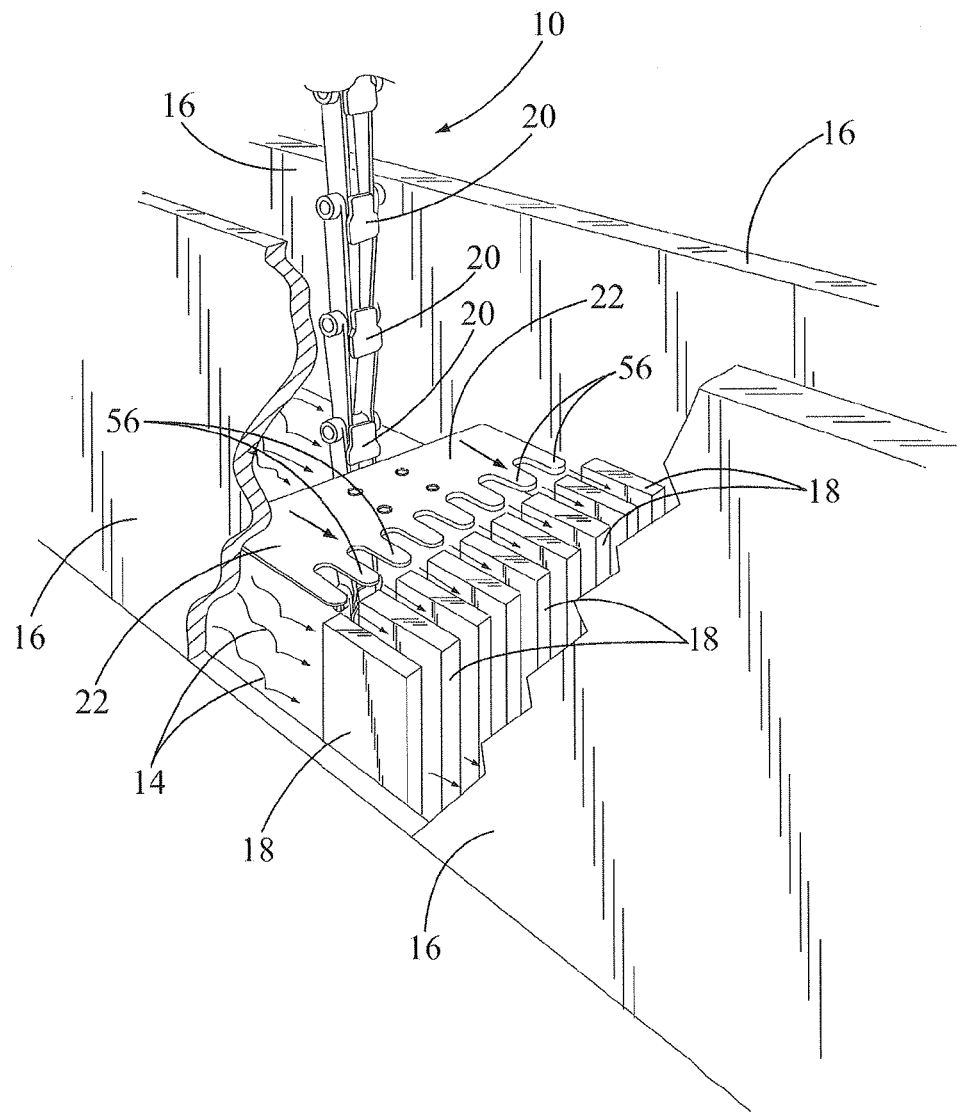
FIG. 4 is a perspective view of a lower portion of the chain assembly with a solid waste rake positioned for removing solid waste from between a plurality of the vertical divider bars disposed in the waste water stream.

In FIG. 4, another perspective view of a lower portion of the chain assembly 10 is shown with the solid waste rake 22 having rake teeth 56 positioned for removing solid waste trapped between a plurality of vertical divider bars 18 disposed in the waste water stream 14.

The embodiments of the invention for which an exclusive privilege and property right is claimed are defined as follows:

1. A method for limiting articulation of a chain joint in a chain assembly, the chain assembly having a wedge shaped chain plate with a neck portion and a body portion, the chain assembly having a pair of spaced apart, first side bars mounted on a chain barrel and a pair of spaced apart, second side bars mounted on the chain barrel, the steps including:
   mounting one end of the neck portion of a chain plate on end portions of the first side bars and above the chain barrel, and
   resting the body portion of the chain plate on a top of the second side bars and bearing there against for preventing articulation of the chain assembly in one direction.

2. The method as described in claim 1 wherein the first side bars are parallel to each other on the chain assembly.

3. The method as described in claim 1 wherein the first side bars form a "V" shape or similar shape on the chain assembly.

4. The method as described in claim 1 wherein the second side bars are parallel to each other on the chain assembly.

5. The method as described in claim 1 wherein the second side bars form a "V" shape on the chain assembly.

6. A method for limiting articulation of chain joints in a chain assembly, the chain assembly having a plurality of wedge shaped chain plates, the chain plates having a neck portion and a body portion, the chain assembly having a plurality of pairs of spaced apart, first side bars mounted on a plurality of chain barrels and a plurality of pairs of spaced apart, second side bars mounted on the chain barrels, the steps including:
   mounting one end of the neck portion of a chain plates on end portions of the first side bars and above the chain barrels, and
   resting the body portion of the chain plates on a top of the second side bars and bearing there against for preventing articulation of the chain assembly in one direction.

7. The method as described in claim 6 wherein the first side bars are parallel to each other on the chain assembly.

8. The method as described in claim 6 wherein the first side bars form a "V" shape on the chain assembly.

9. The method as described in claim 6 wherein the second side bars are parallel to each other on the chain assembly.

10. The method as described in claim 6 wherein the second side bars form a "V" shape on the chain assembly.

11. The method as described in claim 6 wherein the second side bars are parallel to each other on the chain assembly.

12. The method as described in claim 6 wherein the second side bars form a "V" shape on the chain assembly.

13. A method for limiting articulation of chain joints in a chain assembly, the chain assembly having a plurality of wedge shaped or similar geometric shaped chain plates, the chain plates having a neck portion and a body portion, the chain assembly having a plurality of pairs of spaced apart, first side bars mounted on a plurality of chain barrels and a plurality of pairs of spaced apart, second side bars mounted on the chain barrels, the steps including:

mounting one end of the neck portion of a chain plates on end portions of the first side bars and above the chain barrels, and resting the body portion of the chain plates on a top of the second side bars and bearing there against for preventing articulation of the chain assembly in one direction.

14. The method as described in claim 13 wherein the first side bars are parallel to each other on the chain assembly.

15. The method as described in claim 13 wherein the first side bars form a "V" shape on the chain assembly.

* * * * *